B. BROIDO.
SUPERHEATER.
APPLICATION FILED MAR. 4, 1918.
1,323,446.
Patented Dec. 2, 1919.
3 SHEETS—SHEET 2.
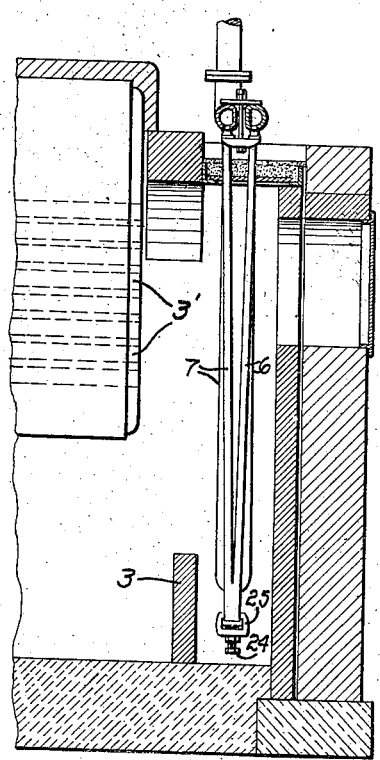
Fig. 4.
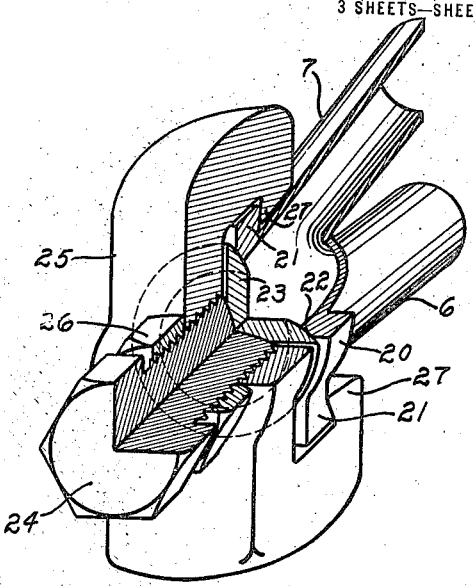
Fig. 5a.
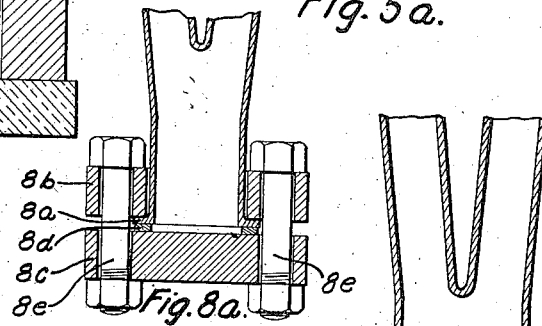
Fig. 8a.
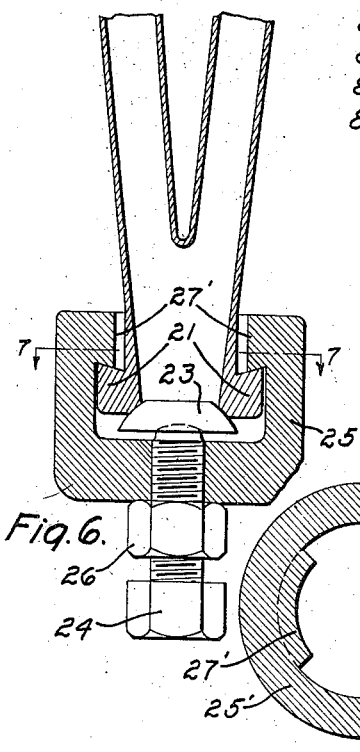
Fig. 6.
Fig. 7.
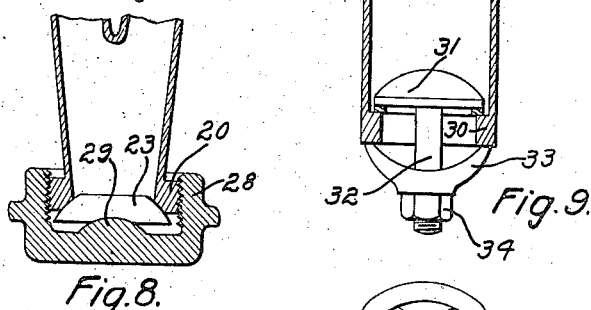
Fig. 8.
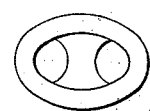
Fig. 9.
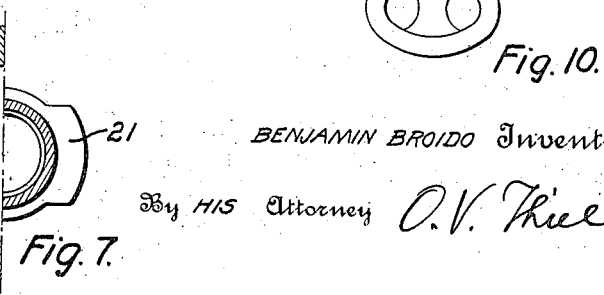
Fig. 10.
BENJAMIN BROIDO Inventor
By HIS Attorney O. V. Thiele

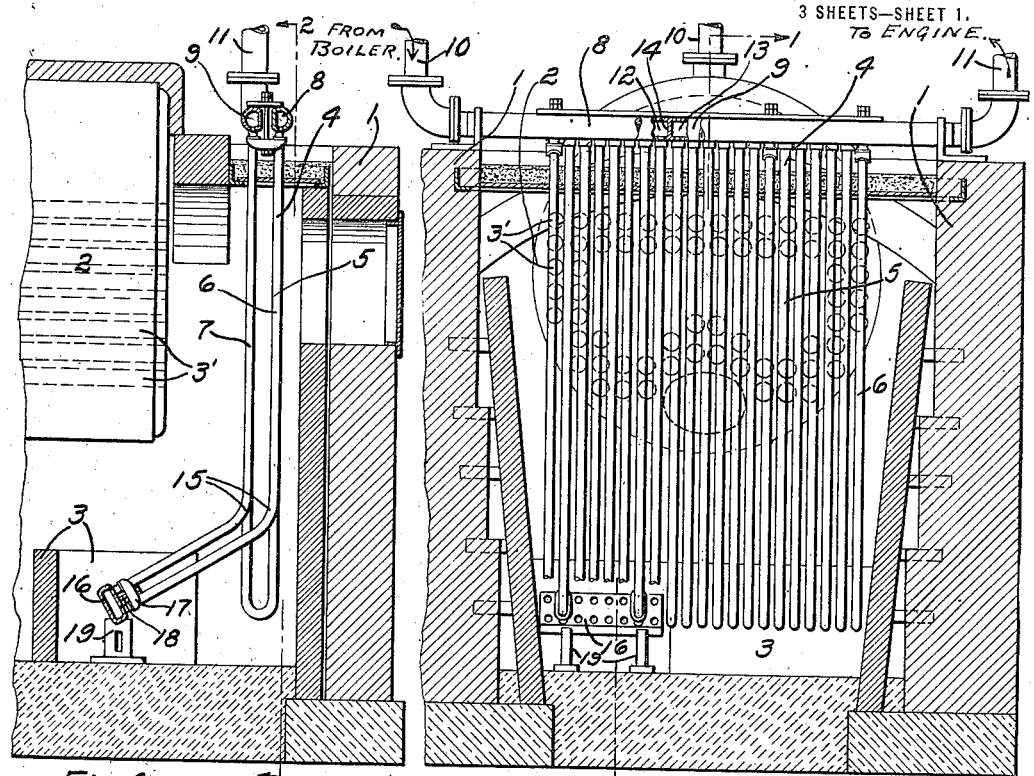
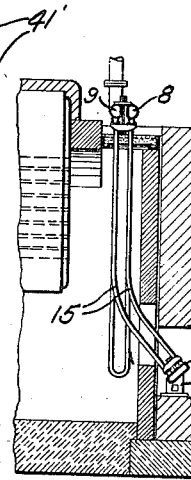

B. BROIDO.
SUPERHEATER.
APPLICATION FILED MAR. 4, 1918.

1,323,446.

Patented Dec. 2, 1919.

BENJAMIN BROIDO Inventor

By HIS Attorney O. V. Thiele

UNITED STATES PATENT OFFICE.

BENJAMIN BROIDO, OF NEW YORK, N. Y., ASSIGNOR TO LOCOMOTIVE SUPERHEATER COMPANY, OF NEW YORK, N. Y., A CORPORATION OF DELAWARE.

SUPERHEATER.

1,323,446.    Specification of Letters Patent.    Patented Dec. 2, 1919.

Application filed March 4, 1918. Serial No. 220,350.

*To all whom it may concern:*

Be it known that I, BENJAMIN BROIDO, a citizen of the Russian Republic, residing in the city of New York, State of New York, have invented a new and useful Improvement in Superheaters, of which the following is such a full, clear, concise, and exact description as is required by the statute. This description is to be read in connection with the accompanying drawings, forming part hereof.

My invention is herein shown applied to superheaters of the kind generally employed for the purpose of superheating steam generated in a boiler in connection with which the superheater is used; it will be understood however that its use is not confined to such cases but that it is of equal utility in case the steam to be superheated is generated in a separate boiler, or in case the fluid to be superheated is some fluid other than steam. In fact, my invention relates to apparatus which is of very general application, and the fact that I have illustrated it here in a superheater is not to be taken as in any way limiting it to any particular use.

The principal objects of my invention are to provide an improved superheater of particular utility where the steam supplied by the boiler is very moist, or where the water holds in solution a large amount of scale-forming materials; and to provide an improved return bend giving accessibility to the interior of the superheater unit.

The several figures of the drawings, briefly stated, illustrate the following:

Figure 1 shows a section on line 1—1 of Fig. 2, looking in the direction indicated by the arrows, and illustrating my invention as applied to a superheater used in connection with a return tubular boiler, only as much of the latter being shown as is necessary to bring out the relation between the boiler and the superheater;

Fig. 2 is a section on line 2—2 of Fig. 1, looking in the direction indicated by the arrows;

Figs. 3 and 4 are views similar to Fig. 1, illustrating modifications;

Figures 11, 12:
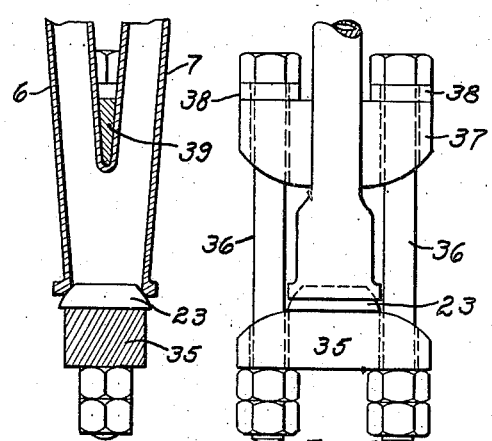
Figures 14, 15:
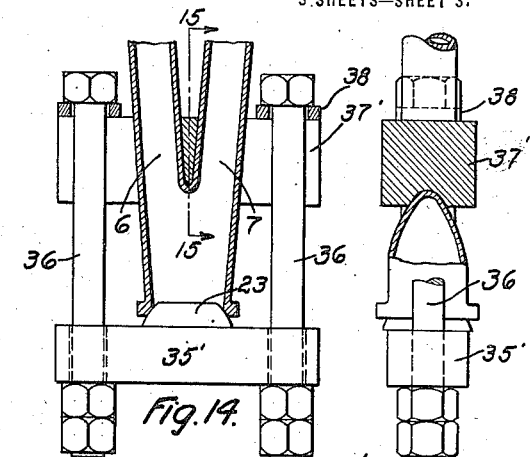
Figure 13:
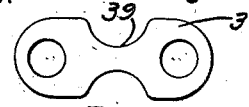
Figure 16:
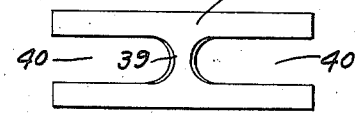
Figure 17:
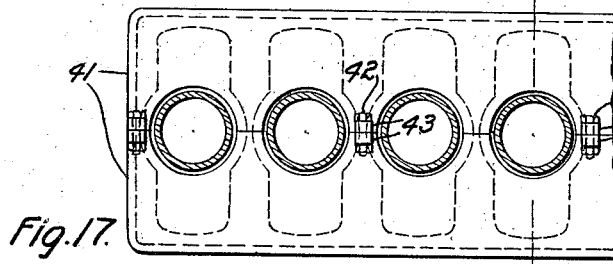
Figure 5:
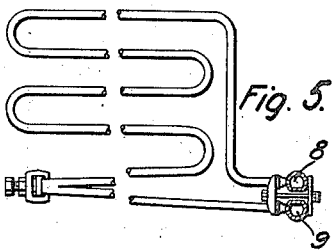
Fig. 5 shows a superheater unit of another form with my invention applied.
Figure 18:
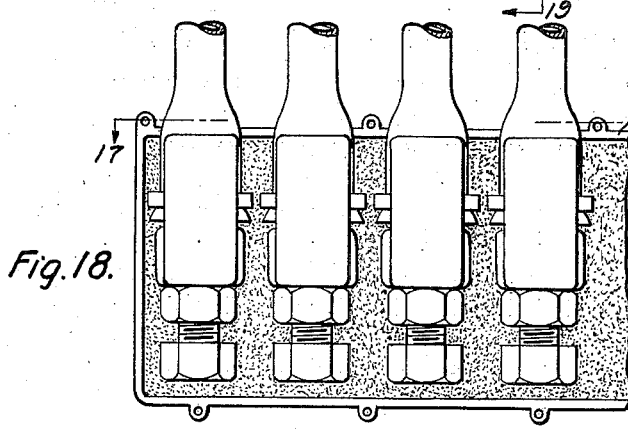
Figure 19:
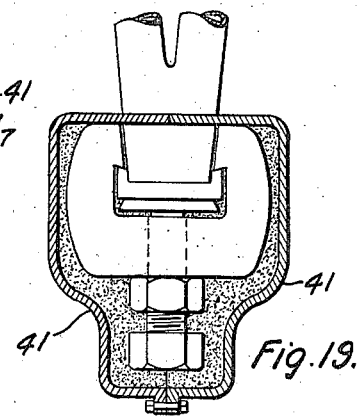

Fig. 5ª illustrates, in perspective, a return bend of a superheater unit according to my invention;

Fig. 6 is a longitudinal central section of a modification, Fig. 7 being a composite view, the left half being a section taken on line 7—7 of Fig. 6, the right half showing a section on the same line, with the cap removed;

Figs. 8, 8ª, 9, 11, and 14 are views similar to Fig. 6, illustrating modifications; Fig. 10 is a bottom view of Fig. 9, the clamp and cover being omitted; Fig. 12 is a side view of Fig. 11; Fig. 13 a top view of the yoke of Fig. 11; Fig. 15 is a side view of Fig. 14 with parts broken away and a part shown in section on line 15—15 of Fig. 14; Fig. 16 is a plan view of the yoke of Fig. 14;

Figs. 17, 18 and 19, illustrate a protective covering applied to the return bends, Fig. 17 being a section on line 17—17 of Fig. 18, Fig. 18 being a side view with one half of the covering removed, and Fig. 19 being a section on line 19—19 of Fig. 17;

Figs. 20 and 21 are views similar to Figs. 17 and 18 respectively, of a modification.

It will be seen that Figs. 1, 2 and 4 are on one scale, Fig. 3 on a slightly smaller, and the remaining figures on a somewhat enlarged scale.

Attention is first invited to the form of my invention illustrated in Figs. 1 and 2. The return tubular boiler 2 is shown here in a setting 1. Hot gases from the furnace (not shown) flow under the boiler toward the right, as viewed in Fig. 1, passing over partition 3, and return toward the left through the flues 31 of the boiler. The superheater 4 is so placed that the gases come into contact with it after their pass under the boiler, and before they return through the flues. The superheater comprises the units 5, each made up of two branches 6 and 7, secured to the headers 8 and 9 respectively. The header 9 has two chambers, 12 and 13, separated from each other by partition 14; while the other header, 8, has only one chamber, co-extensive with the header itself.

One end of header 9 is connected with the steam space of the boiler by pipe 10, and its other end has attached to it pipe 11 leading to the engine or other point of consumption.

It will be noted that the units are of two types, those communicating with chamber 13 having the lower ends of their two branches connected by a simple bend in the pipe, while the two branches of the other are connected by another means described in detail below. The two branches of the latter set each have a bend in them, as at 15.

The course of the steam through the superheater is as follows: From compartment 12 of header 9 it flows downward through branch 7 of that set of units which have one end communicating with this compartment. It then passes up through branch 6 of these units into header 8, thence downward through branches 6 of the remaining units, upward through their branches 7, and so into compartment 13 of header 9, whence it is carried to the engine.

The means of connecting the lower ends of the branches 6 and 7 of the first set of units comprise a box or header 16, to which the ends are secured by the familiar ball joint. This joint forms no part of my invention and it will be unnecessary to describe it in full. It will be noted, however, that a single clamp 17 and a single bolt 18 hold the two ends of a unit to the box. The box 16 is supported on two brackets 19.

The bend 15 is put into the units connected with box 16 to allow for possible inequality in expansion or contraction of the units. If the units were straight, such unequal expansion or contraction would be likely to set up serious stresses and result in leaks and other troubles.

The purpose for connecting the lower ends of only some of the units by the construction described above may be stated as follows: It is almost invariably true that the steam arriving at the superheater carries some moisture with it. This amount is variable, but in any event its evaporation results in a deposit in the superheater of the solid matter brought in in solution by the water. The evaporation and consequent deposit of solids occur within the first part of the travel of the steam in the superheater pipes. Where there are two or more passes for the steam, the evaporation will all occur in the first pass. Whatever provision therefore is to be made for cleaning the superheater units of such deposits needs to be made only with respect to the first pass. It is for this reason that only those units communicating with compartment 12 are provided with a return box or header 16. This construction permits of a ready detachment of the units and of their being cleaned on the inside. It is practically impossible to clean a U-shaped unit to the interior of which access is permitted only through its two ends. While the straight portions may be cleaned, the bend can not, and any scale or deposit left in the bend obstructs the flow of the steam. With the present construction access may be had to every part of the interior of the unit, and the unit can be effectively cleaned. The bend 15, it may be remarked, is so gradual, or on such a large radius, that the cleaning tool is able to follow around it far enough so that by working from both ends it is possible to clean the entire interior.

In Fig. 3 is illustrated a modification of the form just described. Here those units which communicate with chamber 12, instead of being bent forward as in Fig. 1, are bent toward the rear, so that the header or box 16 is located in a space provided for this purpose in the wall and is accessible through the door 16ª. The wall 3 can here be omitted, as the header is in a protected position. The remaining units are arranged as in the first case.

Instead of having a common return box 16, the units communicating with compartment 12 of header 9 may each have its own independent return bend. Such a case is illustrated in Fig. 4, while Fig. 5ª illustrates the return bend used.

As the units are here independent of each other and can expand and contract independently, no bend like bend 15 of Figs. 1 and 3 is necessary. The unit branches are therefore shown straight in Fig. 4. Should one of the branches of a unit of the form of Fig. 4 expand at a rate different from the others, the lower end of the unit is evidently free to swing as required. Except for the differences mentioned the structure of the superheater of Fig. 4 is similar to the one first described. Those units making up the first steam pass are provided with my specially constructed return bend, while the others are, as in Fig. 1, made with a mere bend in the pipe or any preferred form of ordinary return bend.

In Fig. 5ª, illustrating one form of return bend according to my invention, one quarter is cut away, the two limiting sections being axial and at right angles to each other, one of them in the plane of the two pipe axes. The two pipes, 6 and 7, are preferably joined by the well-known process involving the use of a so-called "breeches" die, though any other method may be used if desired. A ring 20 is welded to this open ended structure. If preferred, the ring may be made of the substance of the return bend itself, the end being upset for this purpose. This ring is annular but has two diametrically opposite extended portions or lugs 21.

The ring 20 has a seat 22, engaged by the corresponding seat of disk 23. In practice it has been found best to make the seat 22 conical, and to give the engaging seat of the disk the shape of a spherical segment. Bearing against the disk 23, and holding it to seat 22 is the cap screw 24. The threads of this screw engage the threads of clamp 25. This clamp has two portions 27 hooking over, and engaging the farthest surfaces of, the lugs 21. 26 is a lock-nut on screw 24. It will be clear that a tightening of screw 24 results in seating more forcibly the disk 23 on seat 22. By loosening screw 24, clamp 25 can be slipped off, and disk 23 removed. The interior of the two pipes is then accessible.

Seat 22 and the engaging surface of disk 23 are made spherical so that slight relative displacements are possible without impairing the tightness of the joint. Referring now to Fig. 5, there is here shown a side view of a unit of another form of superheater. The steam, it will be observed, entering header 9, passes through the several loops of the units before returning to header 8. Evaporation of any moisture all occurs in the loop provided with the closure, according to my invention, and the remaining loops may have closed return bends of any preferred construction. It will be understood that the superheater is made up of a whole set of units lying behind the one shown and hence invisible, all attached to the headers like the one shown.

The principle of this form of superheater will be seen to be the same as that of the forms first described, i. e., the interior of the first pass is accessible for cleaning while the remaining passes are not.

In the variation of this closure shown in Figs. 6 and 7, the yoke 25 is superseded by a cap $25^1$, with segmental lugs $27^1$ hooking over the lugs 21 of the open ended return bend. The disk 23, screw 24, and lock-nut 26 are as before. The cap can evidently be removed by giving it a quarter turn after screw 24 has been loosened.

In the form of my device shown in Fig. 8, the cap 28 is screwed directly on the ring 20, which in this case has no lugs and is suitably threaded. The boss 29 on the inner surface of the cap engages the disk 23 and presses it to its seat.

Another form of my invention appears in Fig. $8^a$. Here the open end of the return bend is provided with the flange $8^a$, which is clamped between the flange $8^b$ and the blind flange or cover $8^c$, a gasket $8^d$ being interposed between $8^a$ and $8^c$. The two flanges $8^b$ and $8^c$ are bolted together by bolts $8^e$. It will be clear that the cross-section of the return bend may be circular or elliptical.

By making the aperture of the open ended bend elliptical or of otherwise suitably elongated form, as in Figs. 9 and 10, and providing it with an inner ledge 30, a closure may be used constructed on the principle of the common hand-hole covers, in which the interior pressure assists in seating the cover. Such a cover is shown at 31 its stem 32 passing through the yoke 33 and carrying the nut 34 at its outer threaded end. The operation of this closure is obvious.

The disk 23 in Figs. 11 to 13 is held to its seat by means of the clamp 35, which is forced against the disk by the two screws 36 and their nuts. The farther ends of these screws pass through the yoke 37, their heads bearing on the surface of yoke 37 through the washers 38. The yoke has a saddle-shaped surface 39, which engages the correspondingly shaped surface of the return bend.

In the form of my device shown in Figs. 14 to 16, the clamp $35^1$ and the yoke $37^1$, in lieu of lying at right angles to the plane of the two branches 6 and 7 of the unit, as is the case in Figs. 11 to 13, lie in a plane parallel to that of the two branches. The yoke $37^1$ has a saddle-shaped surface, 39, similar to the yoke of Fig. 13, and similarly engaging the crutch of the return bend. Two slots 40 extend from the saddle-shaped portion outward to each end of the yoke. The branches 6 and 7 of the unit lie in these slots, as do also the two bolts 36. The washers 38 engage the upper surfaces of the forked ends of the yoke.

The purpose of wall 3, Figs. 1, 2, and 4 is to protect the lower ends of the unit. At times it may be found that this wall does not present sufficient protection for the return bends as constructed by me; and in such cases I employ a protective covering, two forms of which are shown in Figs. 17 to 21.

The form of this protecting device made as in Figs. 17 to 19 consists essentially of a metallic cover made in two halves, 41—41, held together by bolts 42, passing through ears 43. These covers are made of lengths to suit the number of units to be protected, and it will be clear that the particular form of closure used does not affect the use of the cover. The space between the cover and the unit is filled with some material that is poor conductor of heat, and able to resist high temperatures.

Instead of having a cover that accommodates the whole set of ends to be protected, each unit may be provided with its individual cover, as shown in Figs. 20 and 21. Each cover is made in halves $41^1$, connected by bolts $42^1$ passing through the ears $43^1$. The interior space outside of the unit is again filled with a heat insulator.

Evidently a number of variations are possible in my invention as herein disclosed without departing from the spirit of the sub-joined claims, and all such variations are meant to be included by them.

What I claim is:—

1. In apparatus of the class described, the combination of a plurality of headers, units connected to them and together with them providing a path for the flow of steam comprising a plurality of passes and means at a point remote from the headers making the interior of the first pass accessible.

2. In apparatus of the class described, the combination of a plurality of headers, units connected to them and together with them providing a path for the flow of steam comprising a plurality of passes and means at a point remote from the headers making the interior of the first pass accessible, the interior of the remaining pass or passes being inaccessible except from the ends attached to the headers.

3. In apparatus of the class described, the combination of a plurality of headers, superheater units detachably secured to said headers, a number of the units less than the total having means to make their interior accessible at a point remote from the headers, the remaining units having their interior inaccessible except from their ends.

4. In apparatus of the class described the combination of a plurality of headers, superheater units comprising return bends detachably secured to said headers, a number of the units less than the total having means to make their interior accessible through the return bends, the remaining units having their interior inaccessible except from their ends.

5. In apparatus of the class described, the combination of a plurality of headers, superheater units comprising return bends detachably secured to said headers, a number of the units less than the total having means to make their interior accessible through the return bends, means to direct a current of hot gases against and along the units, means to protect the return bends from said current, and additional means to protect the return bends permitting access to the interior.

BENJAMIN BROIDO.